United States Patent
Kvist

(10) Patent No.: US 11,008,054 B2
(45) Date of Patent: May 18, 2021

(54) METHOD AND CONTROL UNIT FOR PREVENTING A ROLLOVER SITUATION OF AN ARTICULATED VEHICLE

(71) Applicant: Volvo Construction Equipment AB, Eskilstuna (SE)

(72) Inventor: Roland Kvist, Braås (SE)

(73) Assignee: Volvo Construction Equipment AB, Eskilstuna (SE)

(*) Notice: Subject to any disclaimer, the term of this patent is extended or adjusted under 35 U.S.C. 154(b) by 0 days.

(21) Appl. No.: 16/613,141

(22) PCT Filed: May 15, 2017

(86) PCT No.: PCT/EP2017/061588
§ 371 (c)(1),
(2) Date: Nov. 13, 2019

(87) PCT Pub. No.: WO2018/210399
PCT Pub. Date: Nov. 22, 2018

(65) Prior Publication Data
US 2020/0216120 A1    Jul. 9, 2020

(51) Int. Cl.
| | |
|---|---|
| *B62D 37/00* | (2006.01) |
| *B60K 17/04* | (2006.01) |
| *B60K 17/24* | (2006.01) |
| *B60P 1/04* | (2006.01) |
| *B62D 21/02* | (2006.01) |
| *B62D 21/09* | (2006.01) |

(52) U.S. Cl.
CPC .............. *B62D 37/00* (2013.01); *B60K 17/04* (2013.01); *B60K 17/24* (2013.01); *B60P 1/04* (2013.01); *B62D 21/02* (2013.01); *B62D 21/09* (2013.01)

(58) Field of Classification Search
CPC ........ B62D 37/00; B62D 21/02; B62D 21/09; B62D 49/08; B62D 53/026; B62D 21/186; B60K 17/04; B60K 17/24; B60P 1/04; B60T 2230/03; B60R 16/0233
See application file for complete search history.

(56) References Cited

U.S. PATENT DOCUMENTS

| | | | | |
|---|---|---|---|---|
| 3,934,652 A | * | 1/1976 | Cochran | E21B 23/06 166/285 |
| 2006/0032691 A1 | * | 2/2006 | Strong | B60G 17/0165 180/237 |
| 2010/0307846 A1 | * | 12/2010 | Kvist | B62D 53/005 180/65.22 |

(Continued)

FOREIGN PATENT DOCUMENTS

| | | |
|---|---|---|
| JP | 2000302063 A | 10/2000 |
| WO | 2015180880 A1 | 12/2015 |
| WO | 2016085369 A1 | 6/2016 |

OTHER PUBLICATIONS

International Search Report and Written Opinion of the International Searching Authority dated Feb. 13, 2018 for PCT/EP2017/061588, 11 pages.

*Primary Examiner* — Darlene P Condra
(74) *Attorney, Agent, or Firm* — Sage Patent Group

(57) ABSTRACT

A method of preventing a rollover situation for an articulated vehicle, specifically in relation to the forward vehicle section of the articulated vehicle, is disclosed. A corresponding control unit and a computer program for such an articulated vehicle is also disclosed.

19 Claims, 5 Drawing Sheets

(56) References Cited

U.S. PATENT DOCUMENTS

| | | | |
|---|---|---|---|
| 2011/0115196 A1* | 5/2011 | Wulff | B60D 1/32 |
| | | | 280/477 |
| 2011/0246031 A1* | 10/2011 | Uematsu | B60T 8/4809 |
| | | | 701/50 |
| 2012/0209502 A1* | 8/2012 | Nichols | B62D 53/021 |
| | | | 701/124 |
| 2014/0222299 A1* | 8/2014 | Stander | B60P 1/04 |
| | | | 701/50 |
| 2015/0127229 A1 | 5/2015 | Goraya et al. | |

* cited by examiner

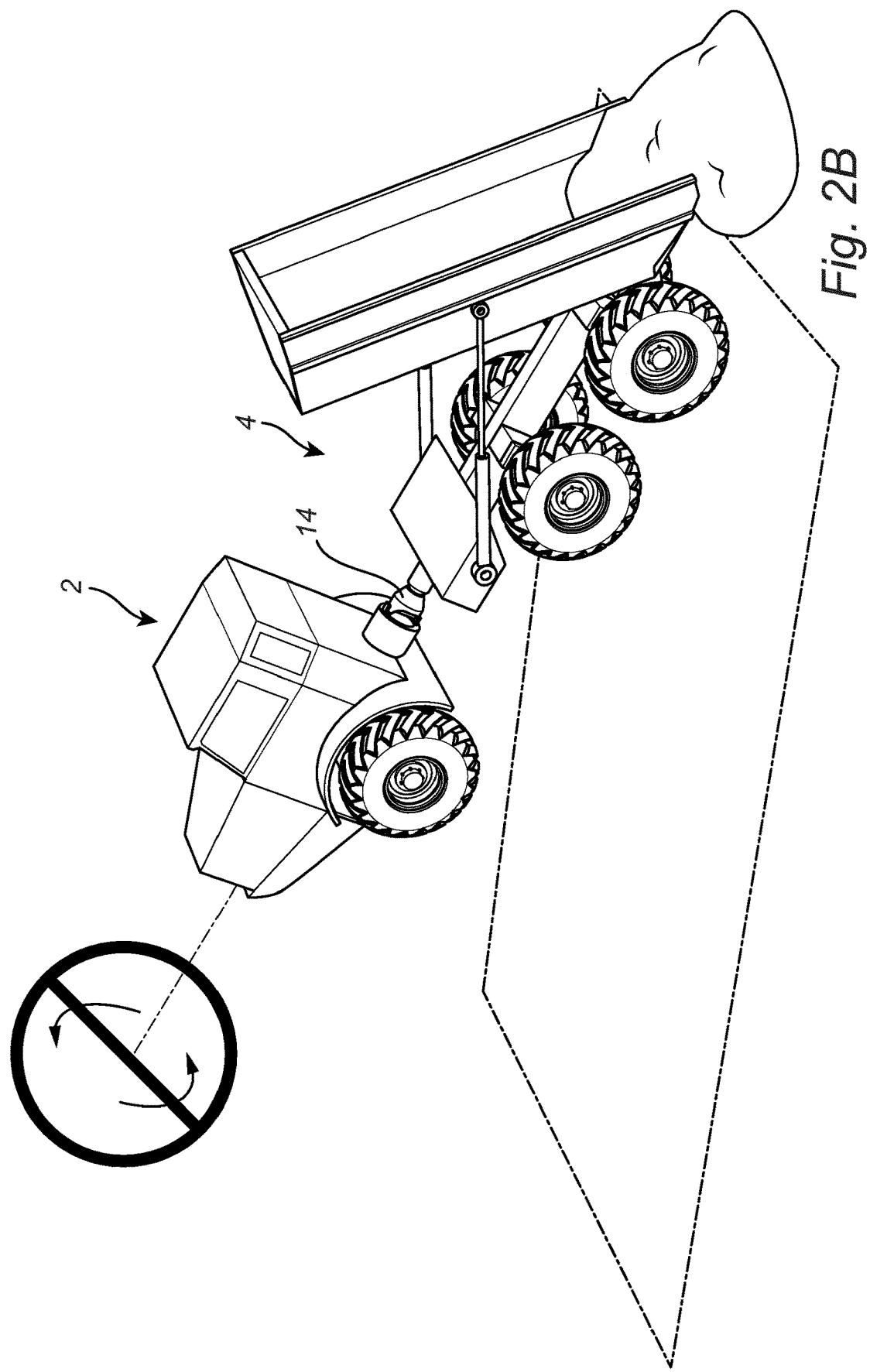

METHOD AND CONTROL UNIT FOR PREVENTING A ROLLOVER SITUATION OF AN ARTICULATED VEHICLE

CROSS REFERENCE TO RELATED APPLICATIONS

This application is a 35 U.S.C. § 371 national stage application of PCT International Application No. PCT/EP2017/061588 filed on May 15, 2017, the disclosure and content of which is incorporated by reference herein in its entirety.

TECHNICAL FIELD

The present disclosure generally relates to a method of preventing a rollover situation for an articulated vehicle, specifically in relation to the forward vehicle section of the articulated vehicle. The present disclosure also relates to a corresponding control unit and a computer program for such an articulated vehicle.

BACKGROUND

In the field of heavy vehicles, working machines in the form of articulated vehicles are often used at construction sites or the like. The articulated vehicle comprises a tractor unit at which an operator cabin is provided, and a trailer unit provided with a dump body for loading material to be transported. The dump body is connected to a frame unit of the trailer and can be raised and lowered by tilting the dump body in relation to the frame unit, which most often is executed by use of hydraulic tilting cylinders such that the material in the dump body can be unloaded to a position rearward of the articulated vehicle.

Furthermore, the tractor unit and the trailer unit of the articulated vehicle are often pivotally connected to each other by a joint arrangement allowing mutual rotation of the tractor unit and the trailer unit around a geometric axis having a horizontal component in the longitudinal direction of the articulated vehicle. Hereby, the articulated vehicle is able to manage the rough terrain that is often associated to construction sites.

However, during some especially unbeneficial situations when utilizing an articulated vehicle, such as e.g. during unloading of material from the dump body and the weight of the load in the dump body is too heavy and/or a large amount of material or a large and heavy stone gets stuck in the dump body, there is a risk that the center of gravity of the machine is displaced rearwards during the unloading operation such that the tractor unit will be raised above the ground. In these relatively extreme and rare situations, when the wheels of the tractor unit are thus raised above the ground such that no connection is present between the wheels and the ground, and the tractor unit is pivotally connected to the trailer unit around an horizontal axis, the tractor unit may rotate and tip over such that the cabin may land on the ground.

WO2016085369 provides an interesting approach to solving such a situation by rotatably fixating ("locking") the tractor unit to the trailer unit of the articulated vehicle in case an upcoming rollover situation is detected. Thus, a safer working environment for the operator positioned in the operator cabin of the tractor unit may be provided, since the tractor unit/cabin may be refrained from "tipping over".

Even though the solution presented in WO2016085369 provides great improvements to the safety of the operator, the present inventor has identified further possibilities to enhancing the safety for the operator, thus further limiting the risks with operating an articulated vehicle at e.g. a construction site or the like.

SUMMARY

According to an aspect of the present disclosure, the above is at least partly alleviated by a method of preventing rollover of a forward vehicle section of an articulated vehicle, the forward vehicle section provided with a forward frame and a wheel axle supported by the forward frame, the articulated vehicle further comprising a rear vehicle section with a rear frame and at least one wheel axle supported by the rear frame, and an articulation joint connecting the forward frame and the rear frame, and adapted to allow the forward frame and the rear frame to pivot in relation to each other with an adjustable level of rotatability, wherein the method comprises increasing the level of rotatability between the forward frame and the rear frame to a level above a rotatability threshold if an intermediate level of rotatability between the forward frame and the rear frame is determined to be below the rotatability threshold, and an upcoming rollover situation for the vehicle is indicated.

Thus, in accordance to the present disclosure, it is possible to control how and when the forward vehicle section of the articulated vehicle is to be allowed to rotate in relation to the rear vehicle section of the articulated vehicle, in case of a possible upcoming rollover situation. An advantage following this implementation is that in case it has been determined that an intermediate level of rotatability between the forward frame and the rear frame is determined to be below a, typically predetermined, rotatability threshold, the forward vehicle section may quickly be "rotatably released" (i.e. increase the rotatability level) from the rear vehicle section.

In a non-limiting example of the present disclosure, it may for example be determined that e.g. the articulated vehicle or at least the rear vehicle section is starting to tip over (being an indication of a rollover situation), while the forward vehicle section at the same time is rotatably fixed to the rear vehicle section (thus being below the rotatability threshold).

Thus, rather than the "full" articulated vehicle (i.e. both the forward vehicle section and the rear vehicle section) tipping over, the rotatability between the forward vehicle section and the rear vehicle section is increase ("loosened"), whereby typically only the rear vehicle section will "continue to tip over". This will thus not stop the rear vehicle section from tipping over, but will "save" e.g. the operator typically positioned in a cabin comprised with the forward vehicle section from tipping over, thereby improving the safety for the operator. In addition, it is from an economical perspective also highly desirable to not tip over the forward vehicle section since rollover of this vehicle section generally results in costly reparations.

The expression "an intermediate level of rotatability between the forward frame and the rear frame is determined to be below the rotatability threshold" should be understood to relate to how well the forward vehicle section is able to rotate relative to the rear vehicle section, and vice versa. Example embodiments of how to the forward frame and the rear frame may be rotatably fixed or how a level of rotation may be increase will be given below.

In an embodiment of the present disclosure, the method further comprises the step of providing an indication of an upcoming rollover situation by determining if an intermediate angular movement in a longitudinal direction of the articulated vehicle is above an angular movement threshold for the articulated vehicle. Typically, the angular movement threshold is set to a pre-defined value of angular movement for the articulated vehicle in relation to a direction perpendicular to a ground level.

In a possible embodiment of the present disclosure, the pre-defined value for the angular movement threshold is set to at least 3 degrees of angular movement for the articulated vehicle in relation to a direction perpendicular to a ground level. In some embodiments of the present disclosure, it may be desirable to also provide the operator of the articulated vehicle with information if there is an upcoming rollover situation, thus making the operator more prepared for this possible scenario.

That is, as is mentioned above, in case there is an indication that the full articulated vehicle (or at least the rear vehicle section) is about to tip over, for example by angular measurements using a suitable sensor, then that is used for identifying the indication of an upcoming rollover situation. In one embodiment, such an angular sensor may be provided with at least one of the forward and rear vehicle section of the articulated vehicle. As understood, in case the forward vehicle section is locked to the rear vehicle section, then an angular rotation due to e.g. a wheel of the rear section "losing ground" may be measured also using an angular sensor arranged at the forward vehicle section.

In an embodiment, the angular sensor is an inclination sensor arranged to measure an angle of inclination of a frame of the articulated vehicle relative to the longitudinal extension of the articulated vehicle, wherein the articulated vehicle is determined to be in the upcoming rollover situation if the measured angle of inclination exceeds a predetermined angular threshold value.

According to an example embodiment, the indication of an upcoming rollover situation may alternatively, or also, be received from a load pressure sensor arranged to measure the load pressure on a wheel axle of the articulated vehicle, wherein the articulated vehicle is determined to be in the upcoming rollover situation if the measured load pressure on the tractor unit wheel axle is below a predetermined pressure threshold level.

In accordance to the present disclosure, it is furthermore in an embodiment desirable to determine the intermediate level of rotatability between the forward vehicle section and the rear vehicle section. Possibly, this determination may be based on information indicating that the forward vehicle section is rotatably locked to the rear vehicle section at the articulation joint. As an alternative, in some situations the forward vehicle section may not necessarily be rotatably locked to the rear vehicle section at the articulation joint, but a gearing arrangement comprised with the articulated vehicle may still affect the level of rotatability between the forward vehicle section to the rear vehicle section.

Accordingly, in an a possible embodiment of the present disclosure, such a gearing arrangement may be adapted to interconnect a drive shaft of the forward vehicle section and a drive shaft of the rear vehicle section, where the gearing arrangement has at least one drive mode and a neutral mode, and the step of increasing the level of rotatability comprises arranging the gearing arrangement in the neutral mode. Thus, by positioning the gearing arrangement in the neutral mode the rotatability between the forward vehicle section and the rear vehicle section may be increased in accordance to the desire of the concept of the present disclosure.

In a possible embodiment of the present disclosure it may be desirable to, additionally, determining a distance between a pair of wheels of the wheel axle of the forward frame and the ground level, wherein the level of rotatability is increased only if determined distance is below a predetermined lift threshold. Possibly, the lift threshold may be set e.g. within a range of 10-30 centimeters or to be determined based on a diameter of the wheels of the wheel axle of the forward frame. This implementation of the present disclosure may in some situations be desirable, since an increase of the rotatability level could lead to an undesirable rotation of the forward wheel section, possibly resulting in that the cabin comprised with the forward vehicle section will in itself be tipping over and even possibly land on the top of the cabin (possibly up to a 180 degree rotation of the forward vehicle section). In such a situation, it may thus be "better" to allow the full-articulated vehicle to be tipping over, which at the most will result in e.g. a 90 degree rotation of the full-articulated vehicle and thus the forward vehicle section. Unloading is one of the modes where there is a risk that the articulated vehicle will be lifted off the ground.

According to another aspect of the present disclosure there is provided control unit configured to prevent rollover of a forward vehicle section of an articulated vehicle, the forward vehicle section provided with a forward frame and a wheel axle supported by the forward frame, the articulated vehicle further comprising a rear vehicle section with a rear frame and at least one wheel axle supported by the rear frame, and an articulation joint connecting the forward frame and the rear frame, and adapted to allow the forward frame and the rear frame to pivot in relation to each other with an adjustable level of rotatability, wherein the control unit is configured to form a control signal for increasing the level of rotatability between the forward frame and the rear frame to a level above a rotatability threshold if the control unit determined that an intermediate level of rotatability between the forward frame and the rear frame is determined to be below the rotatability threshold, and an upcoming rollover situation is indicated. This aspect of the present disclosure provides similar advantages as discussed above in relation to the previous aspect of the present disclosure.

The control unit may in one embodiment be an electronic control unit (ECU) is typically provided as an onboard component of the articulated vehicle, the vehicle for example being a working machine, or any form of corresponding construction equipment. The vehicle may, in some embodiments, comprise an internal combustion engine, or be at least one of a pure electrical vehicle (PEV) and a hybrid electric vehicle (HEV).

It should be understood that the concept according to the present disclosure may be implemented as a computer program, adapted to e.g. be executed using a control unit comprised with the above discussed articulated vehicle. In addition, such an implementation of the present disclosure provides similar advantages as discussed above in relation to the previous aspects of the present disclosure. The computer program may for example be stored onto a computer readable medium, where the computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Additionally, in accordance to a still further aspect of the present disclosure, there is in a similar manner as in regards to the above discussion provided a vehicle comprising a plurality of axles, an inter-axle differential connecting the plurality of axles, and a control unit, wherein the control unit is configured to automatically unlock the inter-axle differential when it is determined that an intermediate level of rotatability between a forward frame and a rear frame of the vehicle is determined to be below the rotatability threshold, and an upcoming rollover situation for the vehicle is indicated. This aspect of the present disclosure also provides similar advantages as discussed above in relation to the previous aspect of the present disclosure.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings:

FIGS. 2A-2C are conceptual illustrations of possible rollover situations for the working machine as shown in FIG. 1;

DETAILED DESCRIPTION

Figure 1:
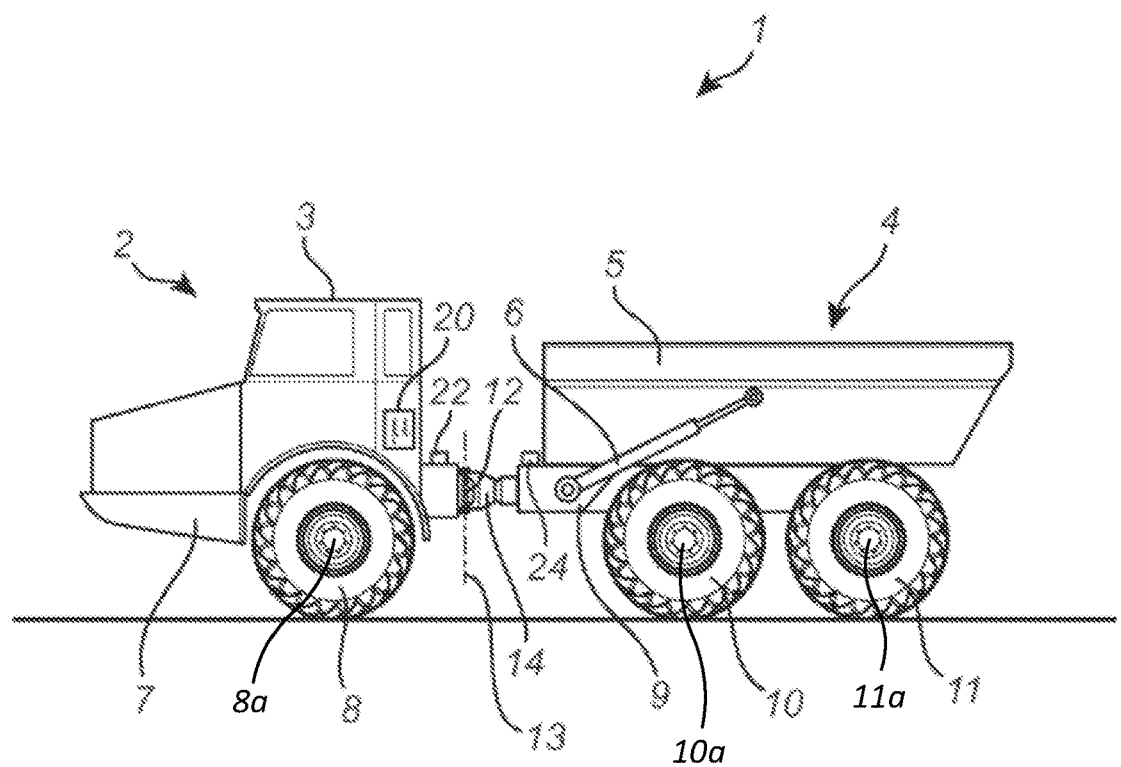
FIG. 1 is a side view of a working machine in the form of a working machine according to an example embodiment of the present disclosure.

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

FIG. 1 is a side view of a working machine 1 in the form of an articulated hauler having a tractor unit 2, also denoted as a forward vehicle section, provided with a cab 3 for an operator (driver) and a trailer unit 4, also denoted as a rear vehicle section, provided with a platform having a dump body 5, here in the form of a container, arranged thereon, for receiving load. The dump body 5 is preferably pivotally connected to the trailer unit 4 and tiltable by means of a material discharge mechanism comprising e.g. a pair of tilting cylinders 6, for example hydraulic cylinders. The tractor unit 2 has a frame 7 and a pair of wheels 8 supported from the frame 7 by a front axle 8a. The trailer unit 4 has a frame 9 and two pair of wheels 10, 11 supported from the frame 9 by rear axles 10a, 11a.

The working machine 1 is frame-steered, using a joint arrangement 12 comprising e.g. an articulation joint 14, connecting the tractor unit 2 and the trailer unit 4 of the working machine 1 for allowing mutual rotation of the tractor unit and the trailer unit around a geometrical axis 13. The articulation joint 14 may possibly comprise an inter-axle differential.

The tractor unit 2 typically comprises a drive unit, where the drive unit comprises e.g. an internal combustion engine and a gearbox/transmission. The drive unit may, also or alternatively, comprise an electric motor and a battery for powering the electric motor. In addition, the working machine 1 may in some embodiments comprise a hydraulic system having two hydraulic cylinders (not explicitly shown), steering cylinders, arranged on opposite sides of the working machine for turning the working machine 1 by means of relative movement of the tractor unit 2 and the trailer unit 4. The hydraulic cylinders can, however, be replaced by any other linear actuator for steering the working machine 1, such as an electromechanical linear actuator.

Figure 2A:
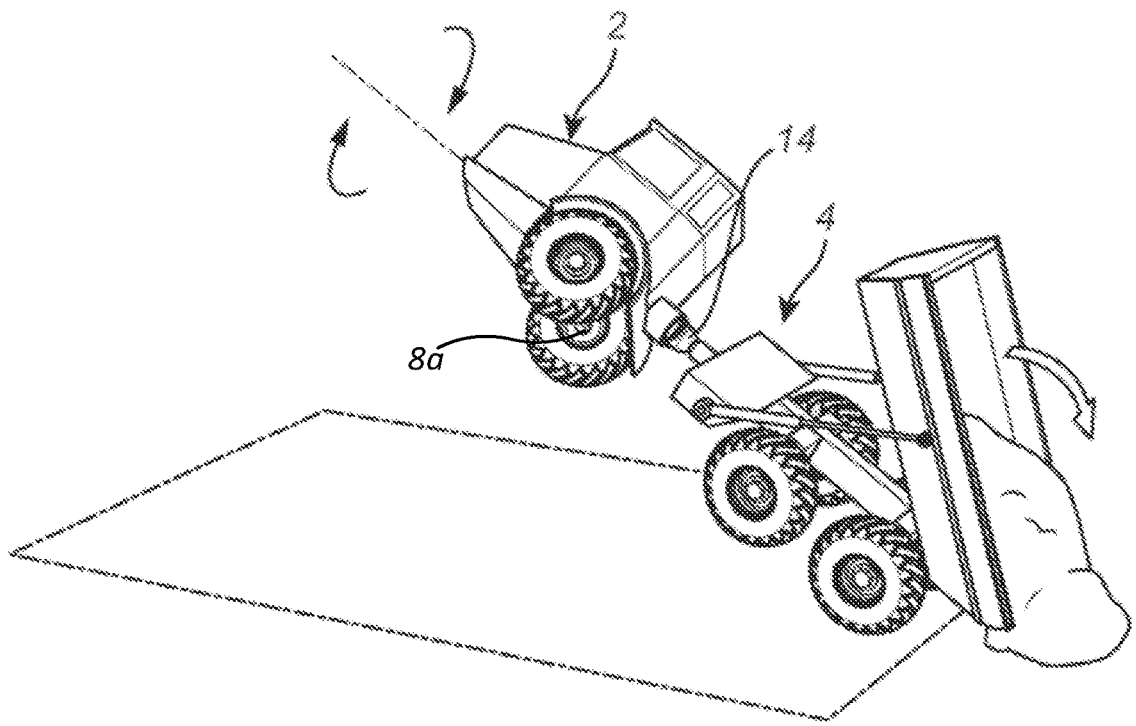
Figure 2C:
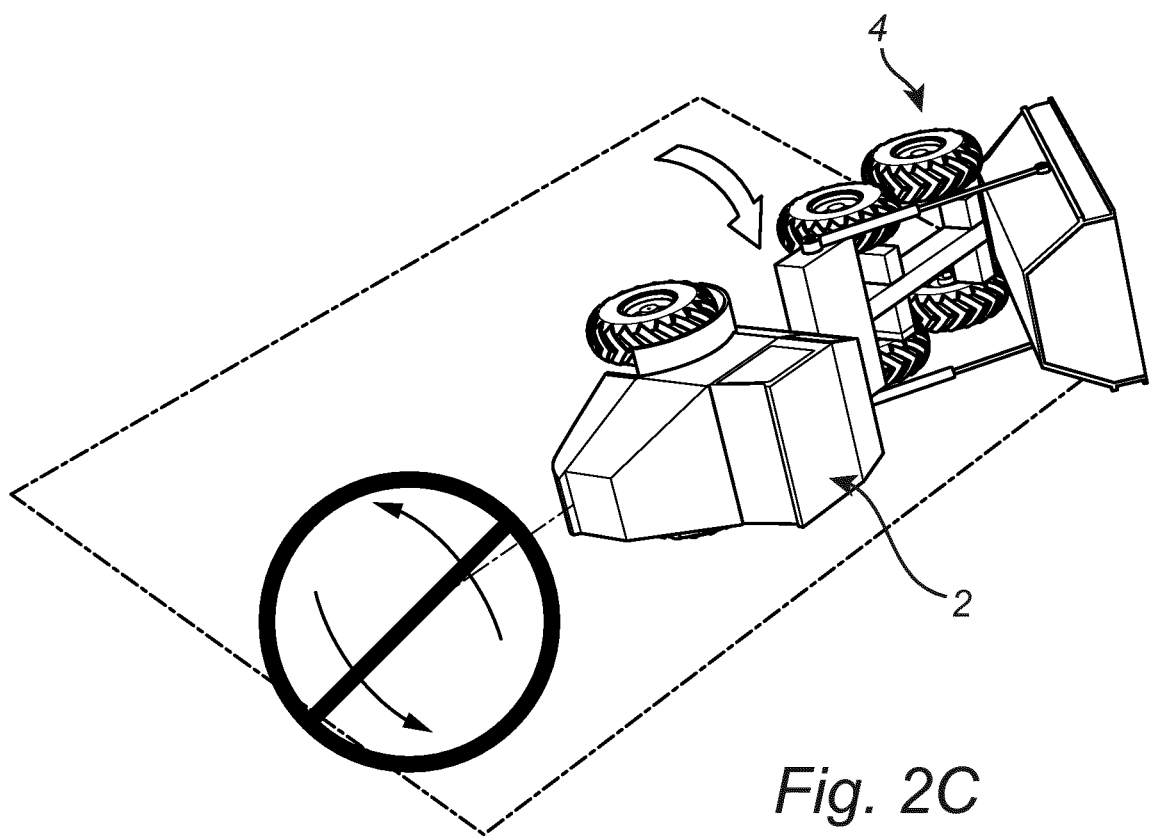

Turning now to FIGS. 2A-2C, providing conceptual illustrations of handling of the working machine 1 as shown in FIG. 1, in relation to working situations, in the following referred to as rollover situations for the working machine 1.

Specifically, in FIG. 2A there is shown an example of where the pair of wheels 8 of the tractor unit 2 of the working machine 1 is lifted off the ground (possibly also a forward pair of wheels 10 of the trailer unit 4 may in some instances, as exemplified in e.g. FIG. 2A be lifted of the ground). That is, the working machine 1 may for example be unloading load from the dump body 5. More specifically, in a case where the load that is to be unloaded from the dump body 5 is in the form of e.g. a large and heavy stone, the center of gravity of the working machine, including the load, may be moved rearwards to such an extent that the tractor unit 2 is lifted off the ground.

The tractor unit 2 may, when the wheels 8 are lifted off the ground, therefore rollover such that e.g. the cabin 3 could land on the side causing damage to the working machine 1 as well as being dangerous for the operator, as exemplified in FIG. 2A. The tractor unit 2 will hence tip due to the joint arrangement 12 of the working machine 1.

Other working situations may also cause the tractor unit 2 to rollover when the wheels 8 of the tractor unit 2 are lifted off the ground. The rollover situation may, for example, also occur if the working machine is reversing and the trailer unit 4 is driven down a relatively steep downhill slope, or if the trailer unit 4 is driven out from a slope such that the rearmost pair of wheels 11 is out of contact with the ground, etc.

To contravene the rollover situation as is shown in FIG. 2A, it has been proposed in e.g. the above mentioned WO2016085369 to "rotationally lock" the tractor unit 2 to the trailer unit 4, including adapting the articulation joint 14 in such a manner such that a level of rotatability between the tractor unit 2 and the trailer unit 4 is decreased. In FIG. 2B there is shown how the tractor unit 2 has been rotationally locked to the trailer unit 4. Thus, in case the wheels 8 are lifted off the ground, the rotational lock between the tractor unit 2 and the trailer unit 4 will force the tractor unit 2 (and thus the cabin 3) to the "stay in position", stopping the cabin 3 to land on the side, as was shown in FIG. 2A.

However, the solution presented in FIG. 2B is not always preferred. Such an undesirable situation may for example take place when the "rotationally locked" full working machine 1 is staring to rollover, possibly also in a situation where the wheels 8 of the tractor unit 2 are still in contact with the ground. This situation is exemplified in FIG. 2C, where e.g. the wheels 10, 11 at one side of the trailer unit 4 of the working machine 1 "loses ground", for example in a case where the wheels 10, 11 at the one side of the trailer unit 4 have been positioned where the ground is somewhat undermined. Since the trailer unit 4 is rotationally locked to the tractor unit 2 the full working machine 1 will rollover, whereby again the cabin 3 could land on the side.

Figure 3A:
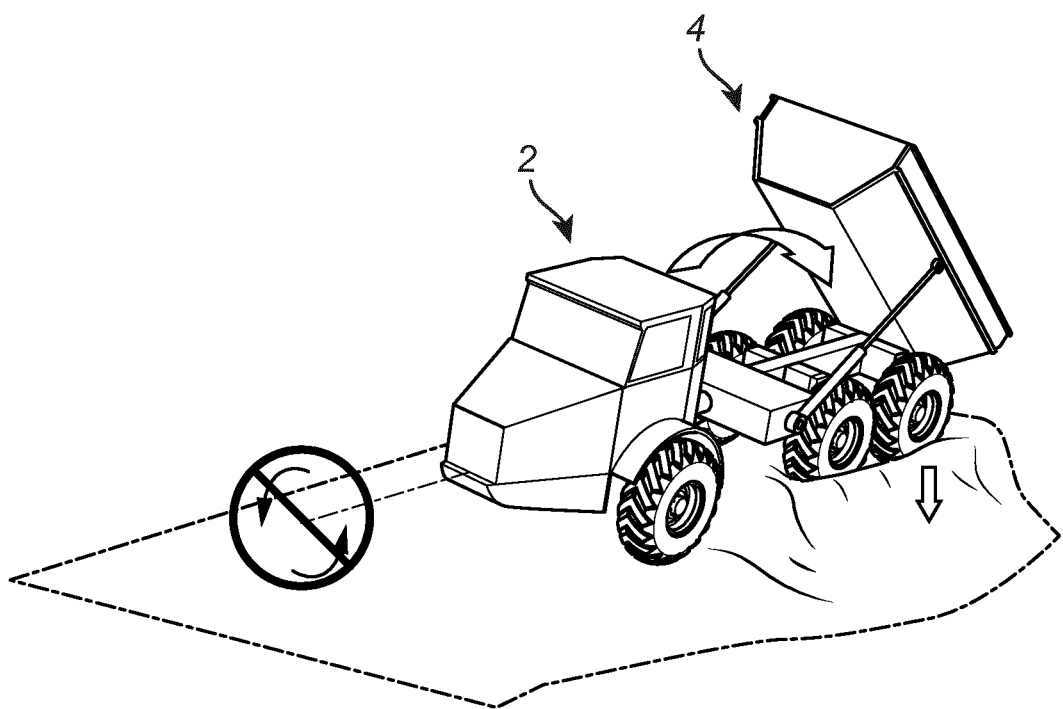
FIGS. 3A and 3B are conceptual illustrations of a possible rollover situation for the working machine as shown in FIG. 1, alleviated in accordance to the concept of the present disclosure.
Figure 3B:
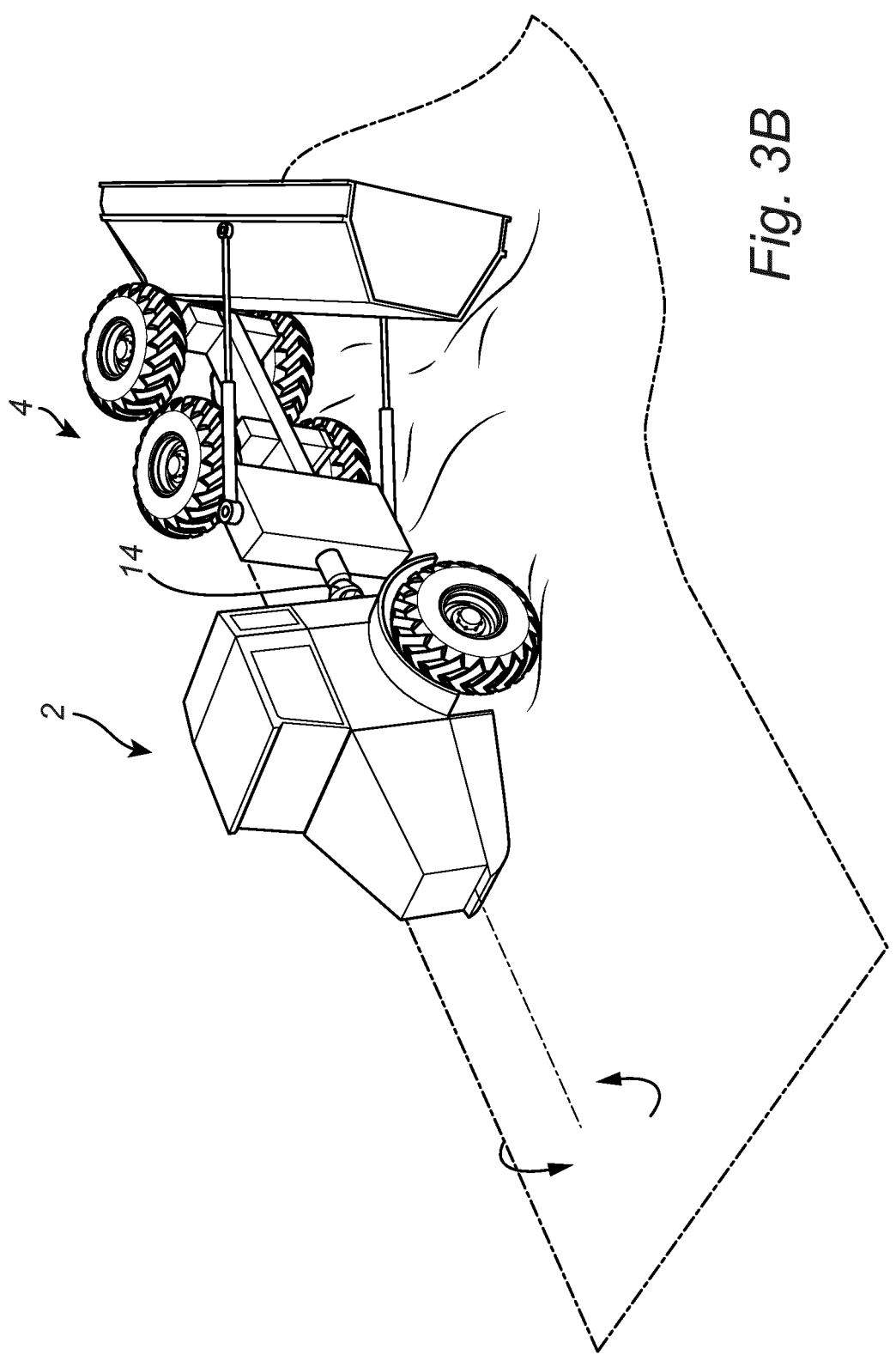
Figure 4:
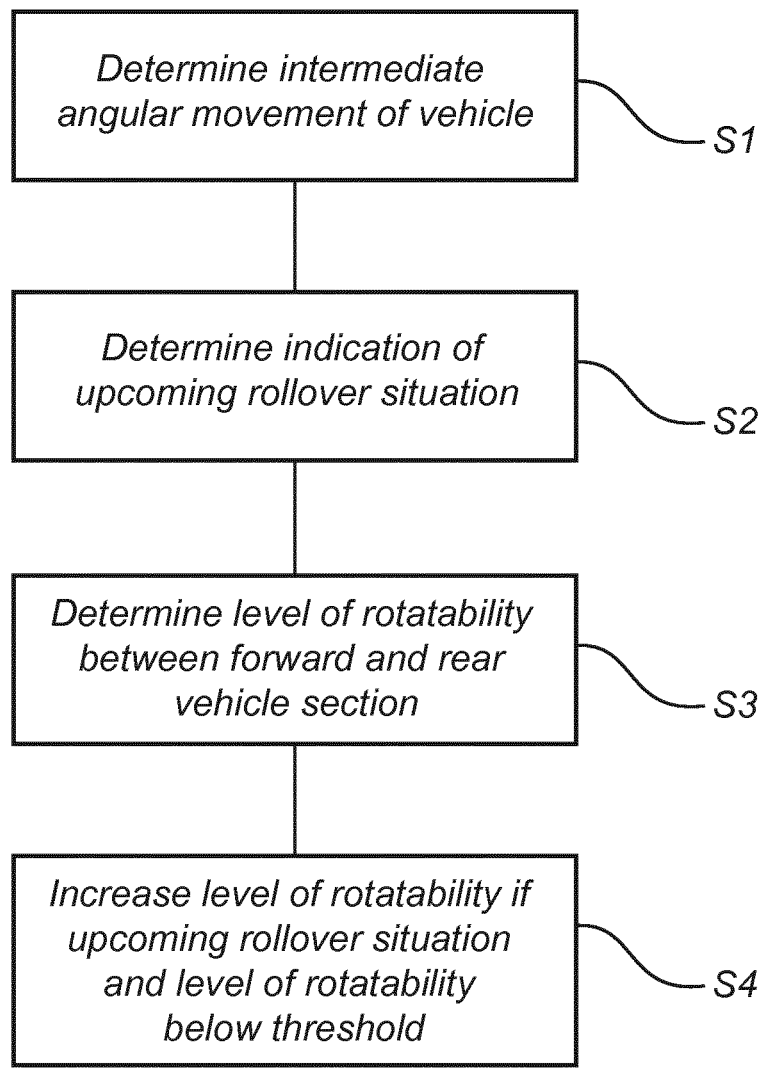
FIG. 4 illustrates the processing steps for performing the method according to the present disclosure.

With further reference to FIGS. 3A and 3B in conjunction with FIG. 4, the possible problematic situation as shown in FIG. 2C may in accordance to the present disclosure be handled by monitoring an intermediate level of rotatability between the tractor unit 2 and the trailer unit 4, and compare this intermediate level of rotatability with a threshold. If the intermediate level of rotatability is determined to be below the threshold, and an upcoming rollover situation for the vehicle is indicated, then the level of rotatability is increased, in a practical example meaning that the tractor unit 2 will be "rotationally unlocked" from the trailer unit 4.

Specifically, in FIG. 3A a control unit 20, such as an electronic control unit (ECU), comprised with the working machine 1 receives information from one or a plurality of angular sensors 22, 24 comprised with the working machine 1 and determines, S1, an intermediate angular movement of working machine 1. It should be understood that the angular sensor(s) 22, 24 may be arranged on either or both of the tractor unit 2 and the trailer unit 4. Based on the determined intermediate angular movement of working machine 1 the control unit determines, S2, an indication of upcoming rollover situation. It should be understood that the communication between the angular sensor(s) 22, 24 and the control unit 20 may be wired or wireless.

Furthermore, the control unit determines, S3, a level of rotatability between the tractor unit 2 and the trailer unit 4, and compares this level of rotatability to the predetermined threshold. In a possible embodiment the threshold is set to above 70%, meaning that the tractor unit 2 most not be completely rotationally locked to the trailer unit 4 for surpassing the threshold.

As is shown in FIG. 3B, the control unit will in case the upcoming rollover situation is determined and the level of rotatability is above the predetermined threshold as a result increase, S4, the level of rotatability to be at least below the threshold. This will as a consequence rotationally unlock the tractor unit 2 from the trailer unit 4 whereby only the trailer unit 4 will rollover. This will accordingly decrease the risk of the cabin 3 landing on the side, thus improving the working environment for the operator.

It should be understood that it in some situations may also be desirable to determine if the wheels 8 of the tractor unit 2 are in contact with the ground or not. Specifically, it may in some embodiments of the present disclosure be possible to only increase the level of rotatability in case a distance between the wheels 8 and the ground is below a lift threshold, possible defined based on a diameter of the wheels 8. That is, in case the distance between the wheels 8 and the ground is too large (e.g. in the range of 1-3 meters), it may be better to keep the tractor unit 2 rotationally locked to the trailer unit 4. In case the tractor unit 2 in such a situation is rotationally unlocked from the trailer unit 4 it could be possible to end up in the undesirable situation as was shown in FIG. 2A.

The control unit may for example be manifested as a general-purpose processor, an application specific processor, a circuit containing processing components, a group of distributed processing components, a group of distributed computers configured for processing, a field programmable gate array (FPGA), etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method of preventing rollover of a forward vehicle section of an articulated vehicle, the forward vehicle section provided with a forward frame and a wheel axle supported by the forward frame, the articulated vehicle further comprising:

a rear vehicle section with a rear frame and at least one wheel axle supported by the rear frame, and an articulation joint connecting the forward frame and the rear frame, and adapted to allow the forward frame and the rear frame to pivot in relation to each other with an adjustable level of rotatability, wherein the method comprises:

increasing the adjustable level of rotatability between the forward frame and the rear frame to a level above a rotatability threshold responsive to:

an intermediate level of rotatability between the forward frame and the rear frame is determined to be below the rotatability threshold, and an upcoming rollover situation for the articulated vehicle is indicated.

2. The method according to claim 1, further comprising:
providing an indication of an upcoming rollover situation by determining that an intermediate angular movement in a longitudinal direction of the articulated vehicle is above an angular movement threshold for the articulated vehicle.

3. The method according to claim 2, further comprising:
determining the intermediate level of rotatability between the forward vehicle section is rotatably fixed to the rear vehicle section.

4. The method according to claim 1, wherein the forward vehicle section is rotatably fixed to the rear vehicle section when the level of rotatability is below the rotatability threshold.

5. The method according to claim 1, further comprising:
determining an intermediate angular movement of the articulated vehicle using an angular sensor comprised with the articulated vehicle for determining if the upcoming rollover situation is to be indicated.

6. The method according to claim 1, wherein the angular movement threshold is set to a pre-defined value of angular movement for the articulated vehicle in relation to a direction perpendicular to a ground level.

7. The method according to claim 1, further comprising:
determining a distance between a pair of wheels of the wheel axle of the forward frame and a ground level,
wherein the level of rotatability is increased in response to the determined distance being below a predetermined lift threshold.

8. The method according to claim 7, wherein the predetermined lift threshold is set within a range of 10-30 centimeters.

9. The method according to claim 7, wherein the predetermined lift threshold is set based on a diameter of the wheels of the wheel axle of the forward frame.

10. The method according to claim 1, wherein the articulated vehicle comprises a gearing arrangement interconnecting a drive shaft of the forward vehicle section and a drive shaft of the rear vehicle section, the gearing arrangement having at least one drive mode and a neutral mode, and the step of increasing the level of rotatability comprises arranging the gearing arrangement in the neutral mode.

11. The method according to claim 1, wherein a drive shaft of the forward vehicle section and a drive shaft of the rear vehicle section are rotatably fixed to each other when the level of rotatability is below the rotatability threshold.

12. The method according to claim 1, further comprising:
providing an operator of the articulated vehicle with information if the upcoming rollover situation is indicated.

13. A computer program comprising program code means for performing the method of claim 1 when said program is run on a computer.

14. A computer readable medium carrying a computer program comprising program code means for performing the method according to claim 1 when said program is run on a computer.

15. A control unit configured to prevent rollover of a forward vehicle section of an articulated vehicle, the forward vehicle section provided with a forward frame and a wheel axle supported by the forward frame, the articulated vehicle further comprising:

a rear vehicle section with a rear frame and at least one wheel axle supported by the rear frame, and an articulation joint connecting the forward frame and the rear frame, and adapted to allow the forward frame and the rear frame to pivot in relation to each other with an adjustable level of rotatability, wherein the control unit is configured to form a control signal for increasing the level of rotatability between the forward frame and the rear frame to a level above a rotatability threshold responsive to the control unit determining that an intermediate level of rotatability between the forward frame and the rear frame is below the rotatability threshold, and an upcoming rollover situation is indicated.

16. A working machine comprising a control unit according to claim 15.

17. A vehicle comprising:
a plurality of axles;
an inter-axle differential connecting the plurality of axles; and
a control unit,
wherein the control unit is configured to automatically unlock the inter-axle differential when it is determined that an intermediate level of rotatability between a forward frame and a rear frame of the vehicle is determined to be below the rotatability threshold, and an upcoming rollover situation for the vehicle is indicated.

18. The vehicle according to claim 17, further comprising: a material discharge mechanism.

19. The vehicle according to claim 17, wherein the control unit is further configured to:
provide an indication of an upcoming rollover situation responsive to determining that an intermediate angular movement in a longitudinal direction of the vehicle is above an angular movement threshold for the vehicle.

* * * * *